B. J. YOUNG.
SHOCK LOADER.
APPLICATION FILED DEC. 26, 1911.

1,068,552.

Patented July 29, 1913.

3 SHEETS—SHEET 1.

Witnesses:
E. C. Skinkle
Geo. Knutson

Inventor:
Bengt J. Young
By his Attorneys
Williamson Merchant

B. J. YOUNG.
SHOCK LOADER.
APPLICATION FILED DEC. 26, 1911.

1,068,552.

Patented July 29, 1913.
3 SHEETS—SHEET 2.

Fig. 3.ª

Witnesses:
E. C. Skinkle
Geo. Knutson

Inventor:
Bengt J. Young.
By his Attorneys
William Merchant

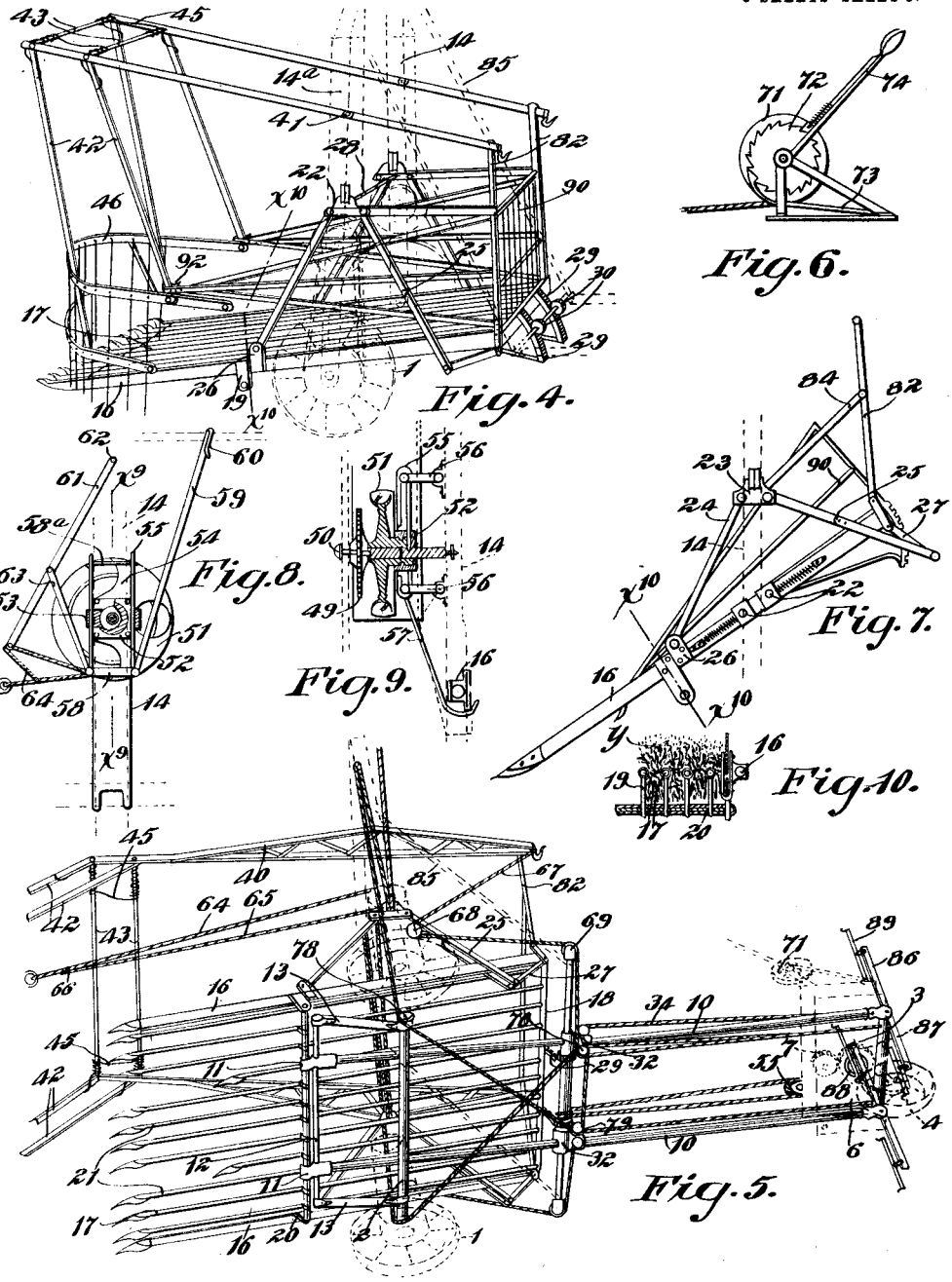

UNITED STATES PATENT OFFICE.

BENGT J. YOUNG, OF MINNEAPOLIS, MINNESOTA.

SHOCK-LOADER.

1,068,552.

Specification of Letters Patent. Patented July 29, 1913.

Application filed December 26, 1911. Serial No. 667,934.

*To all whom it may concern:*

Be it known that I, BENGT J. YOUNG, a citizen of the United States, residing at Minneapolis, in the county of Hennepin and State of Minnesota, have invented certain new and useful Improvements in Shock-Loaders; and I do hereby declare the following to be a full, clear, and exact description of the invention, such as will enable others skilled in the art to which it appertains to make and use the same.

My invention has for its object to provide an efficient shock loader adapted to pick up shocks of grain in the field and carry the same to a threshing machine or elsewhere.

Particularly, the present invention is designed as an improvement on the shock loader disclosed and broadly claimed in my prior Patent 1,107,408, of date, October 31st, 1911.

Generally stated, the present invention consists of the novel devices and combinations of devices hereinafter described and defined in the claims.

In the accompanying drawings which illustrate the invention, like characters indicate like parts throughout the several views.

Figure 1:
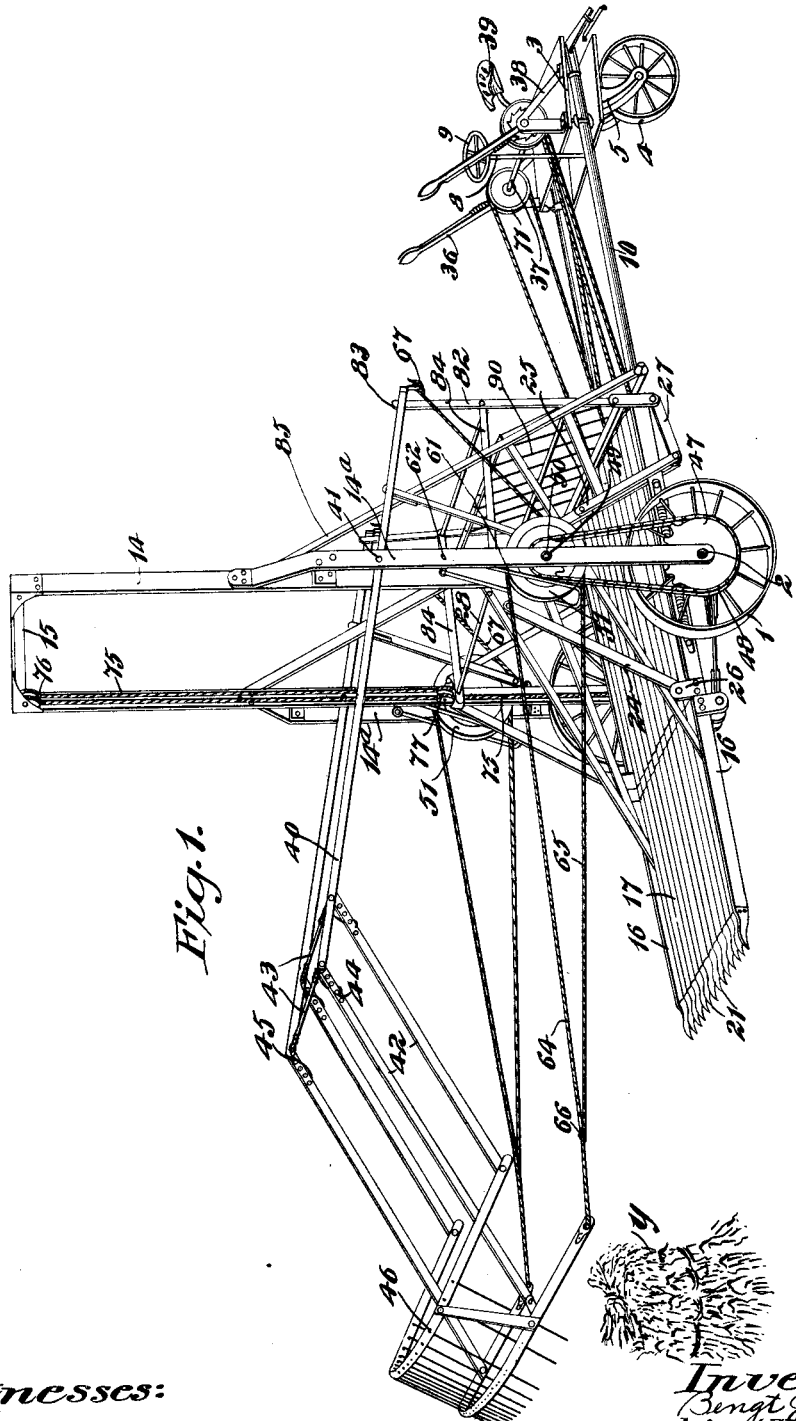
Figure 3:
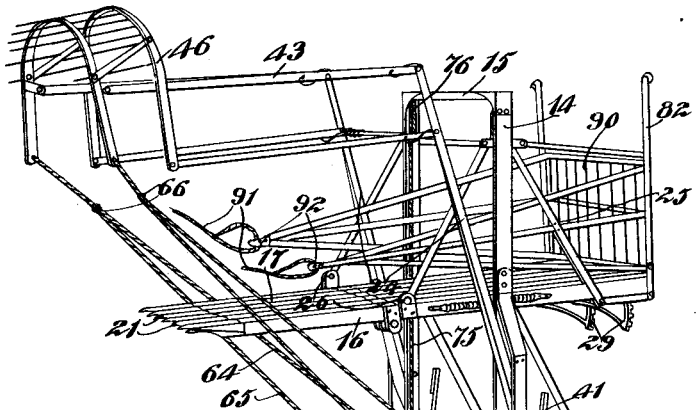
Figure 2:
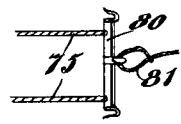
Figure 2:
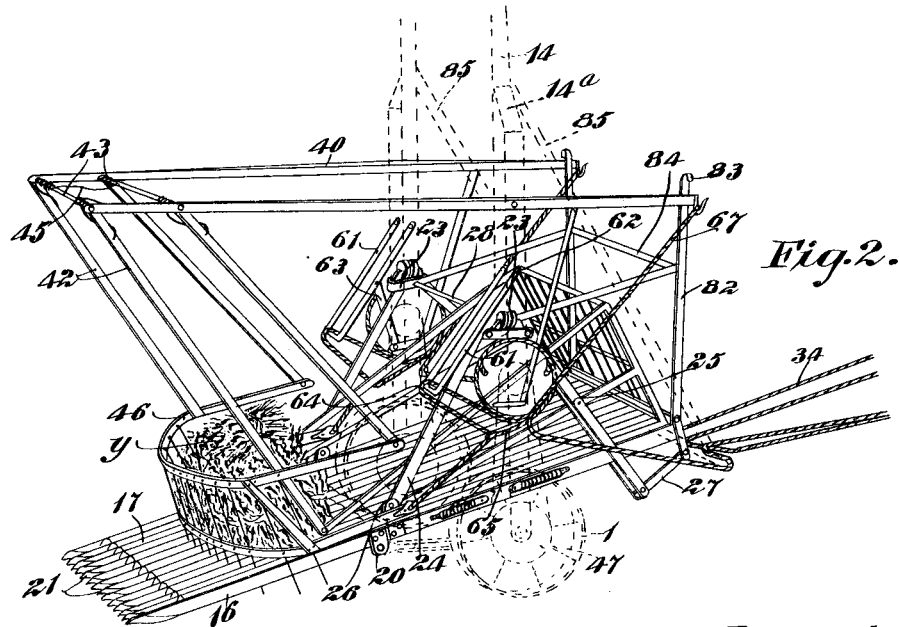

Referring to the drawings, Figure 1 is a perspective view showing the improved shock loader in action, ready to pick up a shock of bundles; Fig. 2 is a perspective view of the machine with some parts indicated by dotted lines, showing the machine in the act of loading a shock onto its gathering platform; Fig. 3 is a perspective view of the machine showing the gathering platform in an elevated position; Fig. 3ª is a view showing portions broken away from Fig. 3 at the points marked $x$—$x$; Fig. 4 is a perspective view of the machine, some parts thereof being indicated by dotted lines, showing the machine with the so-called gathering fork and bundle discharger, interlocked so that they form a cage for containing the bundles while the gathered load is being moved from one place to another; Fig. 5 is a perspective view looking at the under side of the machine, some parts being broken away and some parts being indicated by dotted lines; Fig. 6 is a detail view in side elevation showing one of the cable operating drums and drum operating levers; Fig. 7 is a detail view illustrating the dumping position of the gathering platform; Fig. 8 is a detail view partly in side elevation, and partly in vertical section and with some parts indicated by dotted lines, illustrating clutch mechanism and coöperating devices for coöperation with certain of the operating cables; Fig. 9 is a vertical section taken approximately on the line $x^9$ $x^9$ on Fig. 8; and Fig. 10 is a fragmentary detail in transverse section on the line $x^{10}$ $x^{10}$ on Fig. 4, showing bundles of grain on the gathering platform.

The main portion of the machine is supported by a pair of traction wheels 1, that are journaled to the ends of a transverse axle 2. The rear portion of the machine, to-wit, the operator's platform 3, is supported by a large caster wheel 4, journaled to the depending prongs of a heavy wheel bracket 5, that is connected to the bottom of said platform by a vertical pivot. This wheel bracket 5, at its upper portion carries a spur gear 6, (see particularly Fig. 5,) that meshes with a spur gear 7, secured on the lower end of an upright steering post 8, journaled in the said platform 3 and provided at its upper end with an end wheel 9. The said operating platform 3 is rigidly secured to the rear ends of a pair of parallel push bars 10, the front ends of which are passed over the main axle 2, and at their front ends, are provided with bearing heads 11, shown as rigidly secured to a transverse tie rod 12. The ends of the tie rod 12 are connected to the main axle 2 by a pair of parallel links 13, preferably located outward of the push bars 10. By this arrangement, when the push bars 10 are pushed forward, the main axle 2 will be drawn forward through the links 13, and also, as will hereinafter appear, a very strong, yet flexible construction is afforded. Normally, the front portions of the push bars 10 drop down and rest upon the axle 2.

A pair of vertically extended columns 14, which, at their upper ends are connected by a tie bar 15, are, at their lower ends, rigidly secured to the axle 2. It may be here noted that the said axle, 2, at that main portion, to-wit, between the lower ends of the columns 14, is dropped considerably below the axes of the traction wheels 1. In fact, this intermediate drop portion of the said axle may be a part independent of the end portions, or in other words, the drop portion of the axle, and the trunnion portions on which the traction wheels are journaled, may be separately formed and independently secured to the lower end portions of the columns. The columns 14 are provided with vertically extended outwardly offset brackets or trussed portions 14ª, rigidly secured thereto, with their lower ends secured to the outer ends of trunnions of the axle 2.

The so-called gathering platform is, as shown, made up of outer bars 16 and intermediate bars 17 in parallel arrangement, the outer bars at their rear ends being secured to a tie bar 18, and at their intermediate portions being connected by small coupling brackets 19, to a transverse intermediate tie rod 20. These so-called coupling brackets 19 are preferably made by folding small pieces of sheet metal upon themselves in such a manner that they are slightly flexible and capable of being slightly twisted so as to permit the bars of the gathering platform to spring laterally from end to end into slightly curved form. At their front ends, the said bars of the gathering platform are provided with shoes 21 having sharp upturned ends which adapt them to be passed through bundles of grain and also adapted to said shoes to slide upon the ground without digging into the ground. For some purposes, such, for instance as picking up corn shocks where the stubble must be cleared, some of the bars 17 are made shorter than the others, as illustrated in Fig. 5.

The gathering platform is mounted for vertical movements and for angular tilting movements on the vertical columns 14, preferably by the novel connections. On the outer bars 16 of the said platform are spring-pressed guide rollers 22 that engage the opposing sides of the respective columns 14. These spring-pressed rollers guide the gathering platform, but will yield and separate slightly to permit the desired tilting movements of the platform. Mounted to slide vertically on the said columns 14 above the gathering platform, are guide heads 23 to which the upper ends of downwardly extended links 24 and 25 are pivotally connected. The lower ends of the front links 24 are pivotally connected to small clips 26 secured on the outside bars 16 of the gathering platform. The lower ends of the rear links 25 are connected by short links 27 to the rear end portions of the outside bars 16 of the said gathering platform. The guide heads 23 are preferably spaced apart by a tie rod 28. When the gathering platform is in its lowered position, its intermediate tie bar 20 rests upon fulcrum lugs 11ª formed by forward projections of the heads 11, which it will be remembered are on the front ends of the push bars 10. When the platform is tilted while in lowered position, it moves on the said fulcrums 11ª. The tilting movements of the said platform while in lowered position are preferably produced as follows: The numeral 29 indicates short segmental gears which are rigidly secured to and depending from the rear tie bar 18 of the platform, and normally are in mesh with pinions 30 secured on a common sleeve 31 that is mounted to rotate on a transverse rod 32 rigidly secured in bearings 33 on the intermediate portions of the push bars 10. The sleeve 31 serves as a windlass drum and an endless operating cable 34 is wound upon and attached to the said sleeve so that the said sleeve may be oscillated and the platform positively tilted either upward or downward by movements of the said cable. The said cable 34 is extended rearward and is wound upon and attached to a windlass drum 35. The drum 35, which is provided with an operating lever 36, and is mounted with considerable friction on a transverse shaft 37 is journaled in bearing brackets 38 secured on the operator's platform 3. The numeral 39 indicates a driver's seat carried on the operator's platform 3. When the gathering platform is raised, its segments 29 simply move upward out of engagement with the pinions 30, and when the said platform is again lowered, they automatically reëngage with the said pinions.

A pair of laterally spaced beams 40 which operate as levers and are preferably of trussed form, are extended between the columns 14 and their offset portions 14ª and are intermediately pivoted thereto at 41. To the forwardly projecting ends of the beams 40, depending parallel links or arms 42 are pivotally connected, preferably by transverse spacing rods 43. Preferably, the pivotal connection between the said links 42 and beams 40 is made adjustable by perforations 44 in the said links through any of which the said rods 43 may be passed to thereby raise or lower the lower ends of the said links. Suitable springs 45 applied to the rods 43 to re-act against the said members 42 and 40, yieldingly press the free depending ends of said links 42 upward with sufficient force to raise the gathering device carried by the said links.

The gathering device, designated as a gathering yoke in my prior patent, is preferably of substantially the same structure as that disclosed in the said prior patent and is designated as an entirety by the numeral 46, being preferably a flexible structure with depending prongs or teeth. Also, as in my said prior patent, this gathering yoke is pivotally connected to the lower ends of parallel links 42. The improved means for operating the said gathering device 46 will now be described.

Each traction wheel 1 carries a driving sprocket 47 that drives a sprocket chain 48, the sprocket chain 48 runs over an upper sprocket 49 (see particularly Figs. 1 and 9), loosely journaled on short shafts 50 fixed to the respective columns 14 and 14ª. Mounted to rotate and to slide upon each shaft 50 is a sheave or drum 51 that is provided with a half clutch on its hub adapted to engage with a half clutch on the hub of an adjacent sprocket 49. The hub of each sheave 51 is swiveled in a bearing or cross head 52 that carries a projecting key 53 and a cable guide 54, the upper and lower ends of which latter are turned, respectively, over and under the sheave 51. The projecting ends of the cross head key 53 are arranged to work vertically in upright slotted guide links 55. These guide links 55 are arranged in pairs (see Figs. 8 and 9), and are supported by short parallel arms 56 pivoted to columns 14. A so-called tripping hook 57 is attached to the lower extremities of each pair of slotted guide links 55. The depending hooked ends of these tripping hooks 57 are adapted to be engaged by the outer bars 16 of the gathering platform. As shown, in Fig. 8, the said links 55 are rigidly connected in pairs by lower and upper tie straps 58 and 58ª and to the upper ends of the said tripping hooks 57 are secured the said tie straps 58. To each tie strap 58, the lower end of a tripping bar 59 is pivoted. The upper ends of these tripping bars 59 are provided with hooks 60 that are loosely hooked over the rear end portions of the pivoted beams 40.

The numeral 61 indicates looped or bifurcated tripping levers, which, at their upper ends, are pivoted at 62 to the respective columns 14. Links 63 are pivoted to the intermediate portions of the tripping lever 61 and to the lower corresponding tie straps 58 (see Fig. 8). For pulling the gathering yoke 46 rearward or for holding the same against movement while the machine moves forward, cables 64 are attached to the sides of the said gathering yoke and are brought rearward over the sheaves or drums 51 and attached thereto and adapted to be wound thereon. Similar cables 65 are also connected to the said gathering yokes and are brought rearward and attached to the lower portions of the said sheaves or drums 51. As shown, the said cables 64 and 65, which are on the same side of the machine, are united at 66. The upper cables 64 are passed through the looped lower portions of the corresponding tripping lever 61 and have a peculiar action thereon which will be made clear in the description of the operation. For raising and lowering the pivoted beams 40, cables 67 are attached to the rear ends thereof and are passed over guide sheaves 68, 69 and 70, journaled, respectively, on projections of the guide columns 14, the ends of the rod 32 and on the bearings 33. The rear ends of these cables 67 are attached to and adapted to be wound upon a windlass drum 71 that is journaled with considerable friction on the hitherto described shaft 37. This windlass drum 71, (see particularly Figs. 1 and 6) is provided with a ratchet wheel 72 that is normally engaged by a retaining pawl 73 and by the latch of a lever 74, which latter is pivoted on the shaft 37, adjacent thereto.

For raising the gathering platform bodily as shown in Fig. 3, cables 75 (see Figs. 1 and 5) are attached to the outside bars 16 of said platform, from thence, are extended over power multiplying upper and lower tackle blocks 76 and 77 on the columns 14, and from thence over guide sheaves 78 and 79, respectively, on the main axle 2, and on the bearings 33 (see Fig. 5). From the guide sheaves 79, both cables 75 are brought rearward, preferably through suitable guides, not shown, on the operating platform 3, and are attached to a suitable bar 80 (see Fig. 3ª). This bar 80 is shown as provided with hooked ends so that it may be used as a whiffle-tree, and is also shown as provided with an intermediate hook to which an anchoring rope or cable 81 is adapted to be attached.

For raising the gathering yoke when the platform is lowered and in horizontal position, and for lowering the said gathering yoke when the said platform is lowered and tilted, novel connections, preferably constructed as follows, are employed: The numeral 82 (see particularly Figs. 2 and 4) indicates coupling bars, which, at their lower ends, are pivoted to the rear ends of the side bars 16 of the gathering platform, and at their upper ends are provided with hooks 83 that are adapted to engage the rear ends of the beams 40. These coupling bars 82 are held in operative positions by a bail-like member 84, pivoted thereto, and to the vertically movable heads 23, already described.

The numeral 85 indicates oblique brace bars which connect the intermediate portions of the columns 14 to the end portions of the transverse rod 32.

The machine is adapted to be moved forward by any suitable means, but, as shown, a two-horse evener is applied to the rear platform structure 3. This evener, as shown, is made up of a pair of equalizer levers 86 intermediately pivoted to the rear ends of the push bars 10 and having their inner ends connected by a short cable 87 that runs over a guide sheave 88 on the bottom of the platform 3. At their outer ends, the equalizing levers 86 are shown as provided with swingle-trees 89, but if desired, two-horse eveners may be substituted therefor.

In this machine, I preferably, also, employ a discharger of the same character as that disclosed in my prior patent and for the purposes of this case, the said discharger may be indicated as an entirety by the numeral 90, the same being provided with cables or ropes 91 for drawing the same off from the platform, either when the latter is raised or lowered. As a feature of improvement over the said prior discharger, however, the front ends of the sides of this discharger are provided with hooks 92 that are adapted to be engaged with the rear parallel links or bars 42, to thereby positively connect the said discharger to the gathering yoke to form sort of a cage to securely hold the gathered load on the platform.

Operation: The machine described is capable of use for picking up shocks of any and all kinds of grain or shocks of corn, and it is also capable of use for picking up hay either in cocks or in windrows. In the present illustrations, we will assume the machine to be used to pick up shocks made up of bound bundles of grain, which shocks in the drawing will be indicated by the character $y$. The machine will pick up the bundles whether they are piled in a well formed shock or whether thrown loosely on the ground. Fig. 1 shows the machine with the parts in position to pick up a shock of grain under advance movement of the machine. In the position of the platform, as shown in Fig. 1, the points of the bars of the platform would be passed through the bundles of the shock at a point considerably above the ground. Usually, however, the platform will be tilted, as shown in Fig. 2, when the machine is moved forward to pick up the shocks or bundles. This would necessarily be so when the machine is used to pick up loose grain or hay. The platform is adapted to be tilted on the supporting fulcrum lugs 11ª of the push bars 10, by imparting a rearward movement to the operating lever 36, which movement of the said lever, operating through the cable 34, pinions 30 and segmental gears 29, raises the rear end and lowers the front end of the said gathering platform. In the position of the gathering yoke shown in Fig. 1, it stands raised so that it will pass over the top of a shock of grain; and when the beams 40 are lowered at their front ends, the said gathering yoke, which has then been moved to a point in advance of the shock, will be lowered into contact with the ground ahead of the shock. When the gathering yoke is provided with depending teeth or prongs for engagement with the ground, they will, in themselves, tend to hold the gathering yoke against movement while the machine advances to pick up the shock. Nevertheless, the windlass device and cable connections described, are preferably also employed, and when employed, it is not absolutely necessary that the said gathering yoke or gathering device be provided with prongs for engagement with the ground or, in fact, be actually engaged with the ground. Whenever the platform is tilted, as above just stated, the clutch devices, which operate the gathering yoke from the traction wheels, will be automatically thrown into action, through the following connections, to-wit, when the rear ends of the pivot beams 40 move upward, they pull the hook bars 59 upward and these, in turn, simultaneously raise the parallel slotted links 55, and these, in turn oscillate the arms 56, throwing the said parts into the positions shown in Fig. 9, in which positions, the half clutches of the sheaves 51 are forced into engagement with the half clutches of the sprockets 49, which latter are positively driven from the traction wheels 1. When the sheaves 51 are thus rotated, they wind up the cables 64 and 65 and thereby draw the gathering yoke rearward or hold the same against forward movement, while the machine advances toward the same, and forces the shock upon the gathering platform. When the shock has been properly delivered onto the platform, the operator, by forcing the lever 36 again rearward, moves the platform into a horizontal position, and this movement of the platform into a horizontal position accomplishes two things, to-wit, it throws the operating clutches out of action, and forces downward the rear ends of the beams 40, thereby raising the front ends of the said beams and the gathering yoke 46. The said gathering yoke will then be projected forward by the action of the springs 45. More specifically stated, the clutches are thrown out of action by engagement of the outside bars 16 of the platform which engage with the lower ends of the clutch tripping hooks 57, thereby forcing the parallel arms 56 into the oblique positions indicated by dotted lines in Fig. 9, and this movement of the said arms, operating through the slotted links 55, moves the sheaves 51 laterally, thereby disengaging the half clutches of the latter from the half clutches of the driven sprockets 49. The above described movements of the beams 40 are caused by downward movements of the coupling bars 82 which are attached to the rear ends of the platform and have hooked ends 83 that engage with the rear ends of the said beams 40. The action above just described, is produced at will, by movements of the lever 36, but may be accomplished automatically, under forward movement of the machine, while the platform remains in a tilted position, and this automatic action is desirable especially when picking up loose grain or hay deposited in a windrow where there is a continuous gathering action under forward movement of the machine. This automatic action is produced as follows: When the clutches are in action winding up the cables 64 and 65, they wind the latter faster than the former and thereby produce slack loops in the said cables 64, which loops become drawn taut and against the looped ends of the tripping levers 61 at the time the shock is approximately properly delivered on the platform. Tightening of the cables 64 against the said tripping lever 61, operates through the links 63 to force the slotted links 65 and parallel arms 66 downward, thereby moving the sheaves 51 laterally and disengaging the half clutches thereof from the half clutches of the driven sprockets 49. Fig. 2 illustrates the position of the parts of the same. When the tripping levers 61, by tightening of the cables 64, were drawn downward, as just stated, the tripping bars 59 were also drawn downward, thereby lowering the rear ends of the beams 40 and raising the free front ends thereof; and as the clutches are at this time thrown out of action, thereby releasing the cables 64 and 65, the springs 45 are then permitted to project the gathering yoke again forward, and the weight of the projected yoke on the front ends of the beams 40 will then again drop the said gathering yoke into contact with the ground. This automatic cycle of actions will be repeated over and over again, until the load on the platform is completed, when the automatic action is stopped by forcing the platform into its horizontal or approximately horizontal position. This point, in connection with the operation of the machine should be noted, to-wit, that when the parallel arms 56 are in their horizontal positions shown in Fig. 9, they are on dead centers or at right angles to the slots in the links 55, and hence, positively hold the half clutches of the members 51 and 49 into engagement. The load accumulated on the platform will be pressed backward against the so-called discharger 90, and when the hooked ends 92 of the latter are then engaged with the links 42, as shown in Fig. 4, the gathering device and discharger are interlocked so that they, together with the platform, afford an efficient basket or receptacle for securely holding the load while it is being transported from one place to another, usually from a field to a threshing machine or stack. If the load is to be delivered to a threshing machine, it needs only to be raked off from the platform onto the ground, and this may be easily done by anchoring the cables 91 and then backing up the machine while the gathering platform is in its lowered position, shown in Fig. 4. If the load is to be delivered onto a stack, the gathering device is first raised into an extreme position, and then the platform is raised bodily, as shown in Fig. 3. The gathering device or yoke is raised into the position shown in Fig. 3 by manipulation of the lever 74, which tightens the cables 67. Bodily raising of the platform is produced by drawing rearward on the cables 75. The said manipulation of the cables 75 may be produced in either of two ways, to-wit, by means of the device 81, the said cables may be anchored, and the machine driven forward, or the machine may be held stationary and the cables drawn rearward by a team, or in any other suitable way. The load may be moved off from the raised gathering platform in either of two ways, to-wit, the said platform may be tilted into the inclined position shown in Fig. 7, this being accomplished either by pushing upward on the rear end of the platform or by suitable cable connections, not shown. Or, the load may be raked off from the elevated platform while the latter is in a horizontal position by anchoring the cables 91, and hence, the discharger 90, and backing up or moving the machine rearward. As is evident, the platform will be lowered by gravity whenever the cables 75 are given slack or released.

Now again considering the general construction of the machine it will be noted that the gathering platform is approximately counterbalanced by engagement of its fulcrum or cross bar 20, with the supporting fulcrum lugs 11$^a$, and that it is supported with great flexibility, so that it will pass over obstructions without straining or breaking any of the parts. If, for instance, the bars of the gathering platform should run into irregular ground, or other obstruction which it cannot pass through, the rearward pressure on the front end thereof, will cause the front end of the platform to move upward, the pinions 30 then affording pivotal points and the links 13 permitting such upward movements of the platform. This movement not only cushions the force of any such contact, but permits the platform to move upward and over any ordinary obstruction or irregular portion of the ground. Also, the movements afforded by the links 13 permit one or both wheels to drop into hollows and to pass freely out thereof without straining the machine. By dropping the main body portion of the axle between the wheels, the gathering platform is normally carried low down, so that it does not have to be given a great inclination in order to throw its front end to the ground. When the platform is lowered, it is carried on the push bars 10 and the said push bars rest loosely upon the axle.

What I claim is:

1. The combination with a platform and an axle equipped with wheels, of a pair of links extended forward from said axle and carrying fulcrums for said platform, and a push bar connected to the front end portions of said links and extended rearward of said axle.

2. The combination with a platform and an axle equipped with wheels, of a pair of links extended forward from said axle and carrying fulcrums for said platform, a push bar connected to the front end portions of said links extending rearward over said axle and having a wheel support at its rear end.

3. The combination with a wheel-equipped axle, of a pair of links connected to and extended forward from said axle, a cross rod connecting the front ends of said links, a pair of push bars extended over said axle connected to said cross rod and provided with fulcrums, and a platform intermediately mounted on said fulcrums.

4. The combination with a wheel-equipped axle provided with a depressed transverse portion, of links extended forward from said axle, push bars extended over said axle and connected to said links, and a platform fulcrumed on parts carried with the free end portions of said links and the front end portions of said push bars.

5. The combination with a wheel-equipped axle provided with a depressed transverse portion, of links extended forward from said axle, push bars extended over said axle and connected to said links, a platform fulcrumed on parts carried with the free end portions of said links and the front end portions of said push bars, and a steering wheel supporting the rear end portions of said push bars.

6. The combination with a truck having columns, of a tilting platform fulcrumed on the frame of said truck and mounted for vertical movements on said fulcrums, gear segments on said platform, coöperating pinions mounted on the truck frame, and means for bodily moving said platform vertically on said columns, the said gear segments being disengaged from said pinions by upward movements and reëngaged therewith by downward movements.

7. The combination with a truck frame having platform fulcrums located in front of its wheels, columns carried by said truck, a tilting platform loosely seated on said platform fulcrums and bodily movable on said columns, means for moving said platform on said fulcrums to tilt the same, and means for moving said platform bodily on said columns.

8. The combination with a truck having laterally spaced columns, of a platform mounted for vertical and tilting movements on said columns, vertically movable guide heads on said columns above said platform, and forwardly and rearwardly inclined links supporting said platform from said guide heads, the rearwardly extended links having a double action permitting the platform to be tilted.

9. The combination with a truck having laterally spaced columns, of a platform mounted for vertical and tilting movements on said columns, vertically movable guide heads on said columns above said platform, forwardly and rearwardly inclined links supporting said platform from said guide heads, the rearwardly extended links having a double action permitting the platform to be tilted, and cable connections applied to said columns and guide heads for raising and lowering said platform.

10. The combination with a truck having laterally spaced columns, of a platform having yieldingly pressed guides engaging said columns and permitting the said platform to be raised, lowered and tilted on said columns, vertically movable guide heads on said columns above said platform having connections for supporting said platform and for permitting the tilting movements thereof.

11. The combination with a truck having laterally spaced columns, of a platform mounted for tilting and for vertical movements on said columns, said truck having a fulcrum located in front of its wheel axes and on which the platform tilts when lowered, means intermediately pivoted to said columns, a gathering device supported by the front ends of said beams and movable forwardly and rearwardly, and connections between the rear portions of said platform and the rear ends of said beams operative to raise said gathering device over the shocks, when the said front end of said platform is raised while the platform is lowered.

12. The combination with a truck, of a platform mounted for tilting movements thereon, a gathering device, a support for said gathering device carried by said truck, connections for operating said gathering device from the wheels of said truck, said connections including a clutch, and means for automatically operating said clutch, including a cross head movable laterally with one of the clutch members, a link and coöperating parallel arms for moving laterally said cross head and the clutch member connected thereto, a member connected to one of said parallel arms and arranged to be engaged by said platform to throw said clutch out of action when the front end of said platform is raised from the ground, and a reversely acting connection from one of said parallel links subject to movements of the support for said gathering device and arranged to throw said clutch into action when the said gathering device is thrown forward and lowered into an operative position.

13. The combination with a truck, a platform and a coöperating gathering device, of means for operating said gathering device from a wheel on said truck, including coöperating clutch members, a link mounted to move laterally with one of the clutch members, parallel arms supporting said link, a connection whereby said parallel arms and link will be moved to throw the clutch out of action when the front end of said platform is raised from the ground, and a connection whereby said arms and link will be moved to throw said clutch members into action, when said gathering device is thrown forward and downward into an operative position.

14. The combination with a truck, a platform and a coöperating gathering device, of connections for operating said gathering device from one of the traction wheels of said truck, comprising a clutch, a drum connected to one of the clutch members, a looped cable connecting said drum to said gathering device, a clutch tripping arm through which one branch of the looped cable is passed, a link connected to said lever, and connections intermediate of said link and the movable clutch member, whereby the said clutch will be automatically thrown out of action when the said gathering device reaches a predetermined rearward position on said platform.

15. In a machine of the kind described, a gathering platform having laterally spaced bars free at their front ends and secured at their rear ends, a transverse cross bar extended below the intermediate portions of said bars, and laterally spaced upwardly projecting coupling brackets on said cross bar, attached to and supporting the intermediate portions of said bars.

16. In a machine of the kind described, a gathering platform having laterally spaced spring bars free at their front ends and secured at their rear ends, a transverse cross bar extended below the intermediate portions of said spring bars, and laterally spaced upwardly projecting spring coupling brackets on said cross bar, attached to and supporting the intermediate portions of said spring bars.

17. In a machine of the kind described, a gathering platform having laterally spaced bars free at their front ends and with the front ends of certain of said bars terminated considerably at the rear of the front ends of the other bars, to adapt the platform to gather shocks or bundles while passing in close contact with the ground along a row or rows of stubble.

18. The combination with a truck and a platform carried thereby, of a gathering device, connections supporting said gathering device from said truck, for forward and rearward movements over said platform and in front of the same, a load discharger removably carried on said platform, and means for temporarily connecting said discharger to said gathering device, to thereby form a cage to confine the load on said platform.

19. The combination with a truck and a platform carried thereby, said truck having laterally spaced columns, of beams intermediately pivoted to said columns, links depending from the front ends of said beams, a gathering device carried by the lower ends of said links, and a load discharger removably carried on said platform and provided with side bars provided at their front ends with hooks adapted to be temporarily engaged with certain of the said supporting links, whereby said gathering device and discharger may be temporarily coupled together to thereby form a cage to confine the load on said platform.

20. The combination with a truck, of a gathering platform intermediately fulcrumed thereon, gear segments on the rear of said platform, pinions journaled on the truck frame and meshing with said gear segments, and means for rotating said pinions, the said platform being free to rise at its front end off from its intermediate fulcrums and to move pivotally on the said pinions, substantially as described.

21. The combination with a truck, of a gathering platform intermediately fulcrumed thereon, gear segments on the rear of said platform, pinions journaled on the truck frame and meshing with said gear segments, and means for rotating said pinions, including a cable, a drum actuating cable and a lever connected to move said drum, the said platform being free to rise at its front end off from its intermediate fulcrums and to move pivotally on the said pinions, substantially as described.

In testimony whereof I affix my signature in presence of two witnesses.

BENGT J. YOUNG.

Witnesses:
F. D. MERCHANT,
HARRY D. KILGORE.

---

Copies of this patent may be obtained for five cents each, by addressing the "Commissioner of Patents, Washington. D. C."